US012231701B2

United States Patent
Strubhar et al.

(10) Patent No.: US 12,231,701 B2
(45) Date of Patent: Feb. 18, 2025

(54) SYSTEMS AND METHODS FOR REMOTE CROWD PARTICIPATION DURING A LIVE EVENT

(71) Applicant: VC Noise LLC, Cedar Park, TX (US)

(72) Inventors: Jacob Strubhar, Cedar Park, TX (US); Stephen Shoaff, Cedar Park, TX (US); Talbot Hansum, Cedar Park, TX (US)

(*) Notice: Subject to any disclaimer, the term of this patent is extended or adjusted under 35 U.S.C. 154(b) by 144 days.

(21) Appl. No.: 18/000,281

(22) PCT Filed: May 29, 2020

(86) PCT No.: PCT/US2020/035445
§ 371 (c)(1),
(2) Date: Nov. 29, 2022

(87) PCT Pub. No.: WO2021/242268
PCT Pub. Date: Dec. 2, 2021

(65) Prior Publication Data
US 2023/0148188 A1     May 11, 2023

(51) Int. Cl.
*H04N 21/2187*     (2011.01)

(52) U.S. Cl.
CPC .............. *H04N 21/2187* (2013.01)

(58) Field of Classification Search
CPC .... G06Q 30/0281; G06Q 30/02; G06Q 30/06; G06Q 30/016; G06Q 30/0201; G06Q 30/0601; G06Q 30/0202; G06Q 10/10; G06Q 10/06375; G06Q 10/0639; G06Q 50/01; G06Q 99/00; H04N 21/2187
See application file for complete search history.

(56) References Cited

U.S. PATENT DOCUMENTS

| | | | | |
|---|---|---|---|---|
| 10,616,666 B1* | 4/2020 | Pontiff | ............... | H04N 21/8545 |
| 2013/0097635 A1* | 4/2013 | Yerli | ................... | H04N 21/2187 |
| | | | | 725/37 |
| 2018/0374267 A1* | 12/2018 | Yurkin | ............. | G06K 19/06103 |
| 2020/0146105 A1* | 5/2020 | Pulitzer | ............... | G06F 16/9554 |
| 2020/0320592 A1* | 10/2020 | Soule | .................... | G06F 16/438 |

OTHER PUBLICATIONS

Draper, Alan, Chargers piping in crowd noise to prep for home game? *The Sports Daily*, https://thesportsdaily.com/news/chargers-piping-in-crowd-noise-to-prep-for-home-game/, Oct. 5, 2018.
(Continued)

*Primary Examiner* — Frantz B Jean
(74) *Attorney, Agent, or Firm* — Norton Rose Fulbright US LLP

(57) ABSTRACT

Participation by observers to a live event may be augmented or simulated based on actual participation levels of remote users. The present invention provides methods and systems for observer participation during live events by receiving at least one element of user information from a first set of users; analyzing the at least one element of user information received from the first set of users; and generating a first sensory output based on the at least one element of user information, where the first sensory output is generated at the physical location of an event and/or the physical location of other observers.

18 Claims, 5 Drawing Sheets

(56) References Cited

OTHER PUBLICATIONS

Florio, Mike., Pagano says talk of piped-in crowd noise is an insult to fans. *NBC Sports*, https://profootballitalk.nbcsports.com/2014/10/02/pagano-says-talk-of-piped-in-crowd-noise-is-an-insult-to-fans/; Oct. 2, 2014.
Florio, Mike., Will networks use fake crowd noise for games without fans? *NBC Sports*, https://profootballtalk.nbcsports.com/2020/04/20/will-networks-use-fake-crowd-noise-for-games-without-fans/, Apr. 20, 2020.
International Search Report and Written Opinion issued in Corresponding PCT Application No. PCT/US2020/035445, dated May 29, 2020.
Patra, Kevin., Atlanta Falcons lose 2016 pick for pumping fake noise. NFL.com, https://www.nil.com/news/atlanta-falcons-lose-2016-pick-for-pumping-fake-noise-0ap3000000482500. Mar. 30, 2015.
Salter, Jim., Yamaha's "Remote Cheerer" brings fan applause back to empty stadiums, *ARS Technica,* https://arstechnica.com/gadgets/2020/05/yamahas-remote-cheerer-brings-fan-applause-back-to-empty-stadiums/, May 28, 2020.
Taylor, Brett., Joe Buck Says Fox Sports Will Pipe in Fake Crowd Noise and Put Virtual Fans in the Stands for Broadcasts, bleachemation.com, https://www.bleachemation.com/bears/2020/05/13/joe-buck-says-fox-sports-will-pipe-in-fake-crowd-noi se-and-put-virtual-fans-in-the-stands-for-broadcasts/, May 13, 2020.
Whitner, Gavin., 22 Compelling Benefits of Going to Live Music Concerts, *James Cross,* http:/www.jamescross.co.za/blog/post/22-compelling-benefits-of-going-to-live-music-concerts.

\* cited by examiner

SYSTEMS AND METHODS FOR REMOTE CROWD PARTICIPATION DURING A LIVE EVENT

CROSS REFERENCE TO RELATED APPLICATIONS

This application is a national phase application under 35 U.S.C. § 371 of International Application No. PCT/US2020/035445 filed May 29, 2020, which is hereby incorporated by reference in its entirety.

BACKGROUND

A. Field of the Invention

The invention generally concerns systems and methods for participation by remote observers in any live event. More specifically, the invention allows observers (e.g., fans, supporters, observers, detractors, spectators, and the like) to remotely and/or collectively participate in any live event by expressing sentiments or opinions about the event or its participants from a remote location. Such opinions or sentiments may be shared by generating audio or visual stimuli at the event and/or at the location of other users observing the event. Further information provided by observers provides valuable insights into the impact of observer participation on events and information relevant to marketing and inventories for products related to an event or its participants.

B. Description of Related Art

Event observers (e.g., fans, supporters, observers, detractors, spectators, and the like) have traditionally enjoyed in-person engagement with event participants (e.g., musicians, bands, public speakers, politicians, sports teams, players, and other live entertainers or presenters). Similarly, event participants enjoyed have traditionally enjoyed real time feedback from the event observers in the form of crowd noise, questions from the audience, and/or other audience interactions. However, empty or limited-occupancy venues may be caused by natural disasters, pandemics, or other events, as seen during the Coronavirus pandemic of 2020. These disasters emphasize the need for event organizers to create an atmosphere that looks and feels like a packed house for the benefit of event participants, observers, and related organizers and businesses. This is also true when attendance by observers is low for other reasons, such as an away sports game. During shelter-in-place and social distancing orders required to limit the spread of a global pandemic, for example, traditional events with live audiences must be conducted at substantially reduced capacity or with no live audience at all, except by TV, radio, and internet broadcast. Further, observers often miss the opportunity to attend live events because of illness or personal schedules.

But, event participants benefit from the traditional real-time support and confidence of event observers that can be heard, seen, and felt. Further, event organizers, including venue owners, endorsing companies, sports leagues, and other organizations and businesses, benefit from traditional opportunities to interact with event observers.

In the midst of a global pandemic or other event limiting in person attendance by observers, event participants and organizers need to engage event observers in new and innovative ways. Margins will be tighter than ever, and conventional revenue streams will shrink significantly. In sports contexts, facilitating engagement between observers and teams is critical to maintaining and growing the bonds that people have with their favorite teams. In political or policy making contexts, engaging with decision makers and policy makers, especially in an elections cycle, is important for the public to vet candidates in situations traditionally done in debate forums and auditoriums. In performing arts contexts, the energy of the audience and/or a performer generates rapport and evokes strong emotions for both the observers and the performers. In each of these contexts and others, not only do observers and participants react or feed on the sentiments of the other, individual observers also react and respond to other observers. The emotional response and sentiments experienced during in person, live events are an important aspect of event participation. Being able to engage with both event participants and observers is a large part of what draws individuals, friends, and families together.

The impact of crowd noise on player performance in the sports context, for example, is well-known. See Kevin Patra, "Atlanta Falcons lose 2016 pick for pumping fake noise," NFL.com (available at https://www.nfl.com/news/atlanta-falcons-lose-2016-pick-for-pumping-fake-noise-0ap3000000482500) (last visited May 26, 2020). The importance of the fan base and their cheering physically present at an event is acknowledged by the references to the "the Twelfth Man," common in the context of American football. See, e.g., Mike Florio, "Pagano says talk of piped-in crowd noise is an "insult" to fans," NBC Sports, (available at https://profootballtalk.nbcsports.com/2014/10/02/pagano-says-talk-of-piped-in-crowd-noise-is-an-insult-to-fans/) (last visited May 27, 2020). The importance of feeling connected to participants and/or other observers is a well-known benefit of attending live events of any kind. See Gavin Whitner, "22 Compelling Benefits of Going to Live Music Concerts," Music Oomph!, (available at https://musicoomph.com/live-concert-benefits/) (last visited May 28, 2020).

Further, during the course of the COVID-19 pandemic, various pundits have expressed a need for both fan interactions and discussing the importance of crowd noise during events. See Brett Taylor, "Joe Buck Says Fox Sports Will Pipe in Fake Crowd Noise and Put Virtual Fans in the Stands for Broadcasts," bleachernation.com (available at https://www.bleachernation.com/bears/2020/05/13/joe-buck-says-fox-sports-will-pipe-in-fake-crowd-noise-and-put-virtual-fans-in-the-stands-for-broadcasts/) (last visited May 27, 2020); Matt Birch, "Chargers piping in crowd noise to prep for home game?," The Sports Daily, (available at https://www.msn.com/en-us/sports/nfl/chargers-piping-in-crowd-noise-to-prep-for-home-game/ar-BBNXrQE) (last visited May 27, 2020). Commentators acknowledge the shortcomings of simulated noise that is divorced from real fans and event observers. See Mike Florio, "Will networks use fake crowd noise for games without fans?" NBC Sports (available at https://profootballtalk.nbcsports.com/2020/04/20/will-networks-use-fake-crowd-noise-for-games-without-fans/) (last visited May 27, 2020). Such noise may not synchronize or be appropriate to what is happening at the event or is frustrating to observers because it is not tied to the sentiments of the actual observers to the event. Id. Injected crowd noise that has no relationship to actual observer sentiments feels fake to observers and can be frustrating, feeling like the event organizers are trying to manipulate the audience. There currently is no technology that facilitates interactions between event observers and event participants or among event observers during live events where several or all of the event observers are not physically present at the event.

Thus there is a need for ways to facilitate interactions between event observers and participants and among event observers. The present invention provides novel methods and systems to facilitate interactions between event observers and participants and among event observers.

Additionally, the only way to determine the popularity of an event participant is based on polling, surveys, or sales volumes. Analyzing sales volumes, in particular, is a reactive approach to gauging popularity. Accordingly, there is a need to more accurately predict consumer demand and/or inventories for merchandise related to an event or its participants. Further, sales opportunities are not optimized in existing paradigms. For example, sales of merchandise, such as branded apparel, at live events is popular because of the sense of good-will observers have toward participants when at a live event. Meanwhile, remote observers are not exposed to the same purchasing opportunities as observers at a live event nor do they experience the same sense of good-will towards participants when only passively observing an event remotely on a television, radio, or internet stream.

Thus there is also a need for improved methods to gauge consumer demand for merchandise related to an event or its participants. There is also a need for enhanced and/or more efficient opportunities to market to event observers (whether remote or present at the event). The present invention provides novel methods and systems to gauge consumer demand for merchandise related to an event or its participants. The present invention also provides novel methods and systems for enhancing sales and/or marketing opportunities to event observers through improved good-will from observers and/or additional or more efficient exposure to observers.

SUMMARY OF THE INVENTION

The present invention facilitates engagement between event observers and participants and among event observers, including observes not physically present at an event, by generating physical or visual stimuli that are based on participation or interactions from the observers. Event observers can engage with event participants like never before and can do so from their home, a hospital bed, a sports bar, at the event, the other side of the planet, an airplane, or even the International Space Station. Furthermore, event participants are able to physically experience the sentiments of event observers who are not physically present at an event.

Some embodiments of the present invention also facilitates a revenue stream that has never been available on the scale currently provided by the ubiquity of personal computers and smartphones along with low latency communications, until now. Some embodiments of the present invention also allows more observers to participate in the crowd noise and ambience of a live event than would be possible in a physical venue. Even though the present invention is relevant in natural disasters and the social distancing regime created by the COVID-19 pandemic, the utility of the present idea extends beyond to facilitate enhanced observer participation and as a means for providing real-time feedback to event stakeholders regarding the popularity of event participants, even when venues return to normal operating capacities.

Some embodiments of the present methods promote event participation by receiving at least one element of user information from a first set of users; analyzing the at least one element of user information received from the first set of users; generating a first sensory output based on the at least one element of user information, where the first sensory output is produced in at least one physical location.. Some embodiments further comprise generating a feedback message based on the analysis of the at least one element of user information received from the first set of users; and sending the feedback message to the first set of users. In some embodiments the step of generating the first sensory output occurs in real-time with an event. In some embodiments the physical location where the first sensory output is produced is the physical location of event participants. In some embodiments the physical location where the first sensory output is produced is the physical location of other users. It should be appreciated that users are event observers, but the users may either be at the same venue as the event participants or they may be located elsewhere, e.g., watching the event from home or different location from the event.

Some embodiments of the present systems for promoting event participation comprise a first server capable of receiving at least one element of user information from a first set of users; a first processor capable of analyzing the at least one element of user information received from the first set of users; generating a first output signal from the first processor; and generating a first sensory output from an audiovisual system based on the first output signal, where the first sensory output is produced in at least one physical location. In some embodiments, the first processor generates the first output signal in real-time with an event. In some embodiments the at least one physical location comprises a venue where a participant is participating in the event. In some embodiments, the at least one physical location comprises a location of an event observer, including, for example, a user who is a broadcast recipient observing the event.

In some embodiments the first sensory output or the first output signal are generated in near real time to the time that the user information is received. For example, if an observer watching an event indicates in their user information that they would like to cheer for a participant, the first sensory output or the first output signal (depending on the embodiment) will be generated in near real time to the user providing user information. For example, in some embodiments, a user may input information indicating a desire to cheer for a basketball player when they receive the ball that generates a either a first sensory output or a first output signal (depending on the embodiment) before that basketball player has scored. Thus, the timing between receipt of user information and generation of the first sensory output or the first output signal is near real time but the exact tolerances for what constitutes real time depends on the context of the event.

The present invention allows event observers to affect the atmosphere of an event with more impact and control than they would have just by being in the live audience of an event. Observers can engage with one another using the present system and/or methods to strategize when and how to participate in an event to affect the atmosphere and impact the confidence of an event participant. Observers can see their collective impact in visual representations generated through computer analytics in various formats such as banners, tickers, scaled audio signals, displays, and/or overlays designed to reflect the level of observer participation during an event.

The term "coupled" is defined as connected, although not necessarily directly, and not necessarily mechanically.

The terms "a" and "an" are defined as one or more unless this disclosure explicitly requires otherwise.

The term "substantially" is defined as being largely but not necessarily wholly what is specified (and include wholly what is specified) as understood by one of ordinary skill in the art. In any disclosed embodiment, the term "substantially" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, the methods and systems of the present invention that "comprises," "has," "includes" or "contains" one or more elements possesses those one or more elements, but is not limited to possessing only those one or more elements. Likewise, an element of a method or system of the present invention that "comprises," "has," "includes," or "contains" one or more features possesses those one or more features, but is not limited to possessing only those one or more features.

Furthermore, a structure that is capable of performing a function or that is configured in a certain way is capable or configured in at least that way, but may also be capable or configured in ways that are not listed.

The feature or features of one embodiment may be applied to other embodiments, even though not described or illustrated, unless expressly prohibited by this disclosure or the nature of the embodiments.

Any method or system of the present invention can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure may not be labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF THE INVENTION

Figure 1:
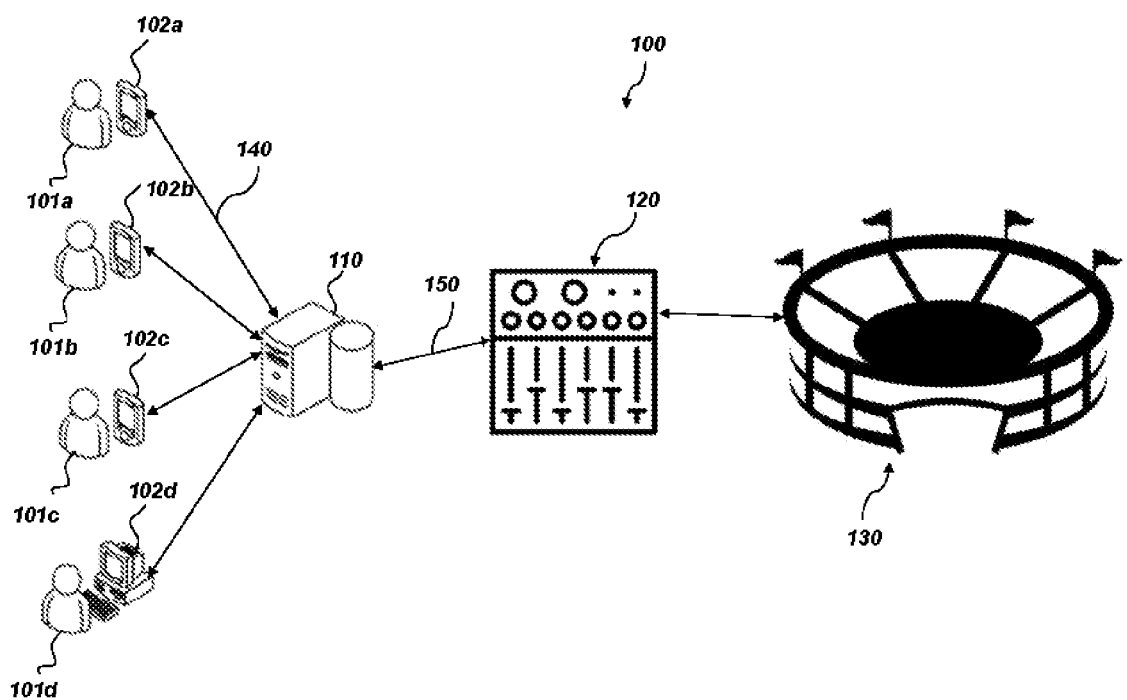
FIG. 1 illustrates one embodiment of the present systems for remote fan participation at the physical location of a live event.

Various features and advantageous details are explained more fully with reference to the non-limiting embodiments that are illustrated in the accompanying drawings and detailed in the following description. It should be understood, however, that the detailed description and the specific examples, while indicating embodiments of the invention, are given by way of illustration only, and not by way of limitation. For example, several illustrative embodiments may relate to a particular context, such as sports, but should not be construed to limit the present invention to only sports-related contexts. Further, various substitutions, modifications, additions, and/or rearrangements will become apparent to those of ordinary skill in the art from this disclosure.

In the following description, numerous specific details are provided to give a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Some embodiments of the present methods comprise receiving at least one element of user information from a first set of users; analyzing the at least one element of user information received from the first set of users; and generating a first sensory output based on the at least one element of user information, where the first sensory output is generated at a physical location. In some embodiments the step of generating the first sensory output occurs in real-time with an event. In some embodiments the physical location where the first sensory output is produced is the physical location of event participants. In some embodiments the physical location where the first sensory output is produced is the physical location of other users. It should be appreciated that users are event observers, but the users may either be at the same venue as the event participants or they may be located elsewhere, e.g., watching the event from home or different location from the event.

In some embodiments the at least one element of user information from a first set of users is location information. For example, by analyzing information such as an interne protocol (IP) address or information about location provided by a user, some embodiments can weight a user's input in generating the first sensory output. In some instances, observers located in the same city as the participants that they are supporting may be given more weight in the analysis determining the sensory output to be generated. Conversely, observers located outside of the city associated with event participants may be given more weight as a way of rewarding participants for having a widespread fan base. In some embodiments, users supporting participants who are playing at their "home" venue may receive additional weight in the analysis determining the sensory output to be generated to simulate an "at home" or "home court" advantage.

Similarly, some embodiments may equalize user input to remove any "at home" advantage.

In some embodiments at least one element of user information from a first set of users is opinion information. Opinion information may, for example, indicate a positive preference for a participant in the event. In some embodiments, opinion information is used to determine the sentiment of one, several, or all users observing an event. For example, a user may elect to support or "cheer" for a specific player or team or input user information indicating opinions about a particular issue, participant, or occurrence within an event. Accordingly, the first sensory output based on that user information may be used to understand the sentiment of a specific user, several users, or all users observing an event. In one embodiment and by way of example, in the context of American football, basketball or soccer, multiple users indicate that they would like to cheer as loud as possible when their favorite player has the ball. Some embodiments will aggregate these elections from observers to increase the volume of an audio output at the event in relation to the number of aggregated opinion information indicating support for that player. The relationship between the opinion information and the activity in the event may be directed and specific, e.g., indicating support for a specific participant at specific times, or it may be more general and less specific, e.g., indicating general support for the event itself, a participant team, band, or party, or for a specific team in a given match or game. The latter example of opinion information based on general support is used in some embodiments to augment the first sensory output at the event at times specific to the type of event, such as louder cheering when a supported team has possession of the ball or is a certain distance from a goal. In addition to cheering noises, in some embodiments positive opinion information may also correlate to uplifting, encouraging, congratulatory, or otherwise supportive audio and/or visual feedback, such as high energy music or physical or emulated pyrotechnics, balloons, confetti, polling information, survey results, and the like.

Conversely, opinion information may also indicate negative preferences for a participant in an event. In the same way that positive preferences may be indicated by opinion information to augment the first sensory output, negative opinion information may be used to either offset positive opinion information or to inject negative support, such as booing or hissing. In some embodiments of the present invention, opposing opinion information is analyzed depending on the type of event, timing, or other characteristics of users or the opinion information itself. The results of the analysis of offsetting or opposing opinion information is used in some embodiments to determine the first sensory output at the physical location of an event and/or the physical location of other observers.

In some embodiments opinion information indicates user sentiment about a topic, an event, or a participant. In some embodiments opinion information indicates user sentiment for one or several observers. In some embodiments opinion information, including information about sentiment for a single user or many users, is synthesized from analysis of one or more elements of user information.

In some embodiments opinion information may be analyzed to provide a proxy or direct indicator of consumer demand for merchandise related to an event or a participant to an event. Such proxies or indicators may be used to target promoted content to specific users and/or to predict product inventories, production rates, sales forecasts, or optimized pricing.

In some embodiments the at least one element of user information from a first set of users is a request for the first sensory output. In some embodiments, a set of users may comprise a single user or multiple users. In some embodiments the at least one element of user information may be a request for a specific first sensory output. For example, a set of users may specifically request an audio or visual output, either generally or at a specific instance in time. The decision to grant the request may be filtered by numerous factors, including user locations, user status within the given system (e.g., frequent users or team owners may have more direct say or weighted input into an algorithm deciding what or when to generate the first sensory output).

In some embodiments the at least one element of user information is noise or sound received from a user. In some embodiments the at least one element of user information is an image or video received from a user.

In some embodiments the first sensory output is an audio signal played at the physical location of the event that is perceptible to at least one participant in the event. For example, and as alluded to above, a cheering noise may be used to indicate support for a participant. Such noises are intended to support the event participants and therefore should be perceptible in some embodiments. In other embodiments, the first sensory output may be perceptible to other users in addition to the participants in order to encourage rivalry and competition. In other embodiments, the first sensory output may be perceptible to other users but not the participants.

The first sensory output in some embodiments comprises various audio or visual stimuli, including, for example, simulated clapping, simulated crowd noise, simulating booing, simulated hissing, simulated graphics, music, physical or simulated pyrotechnics, videos, noise received from users, video received from users, aggregated noise received from users, aggregated video received from users, and/or the like. Regardless of the type of first sensory output some embodiments of the present invention make such outputs perceptible to at least one participant in the event.

In some embodiments the first sensory output may be selected from a pre-populated list of outputs that are tailored to specific types of events, participants, event organizers, speakers, presenters, sports, leagues, teams, or individual players. In some embodiments the pre-populated list may be adjusted in real time based on active participants in the event. For example, in a sports context, player-specific chants may be available in a queue for users to select as part of their user information. As another example, a political debate may include the ability for remote observers to participate and share opinions or sentiments regarding topics or speakers in real time.

The physical location of an event will vary based on the type of event, e.g., a theatrical performance, a political debate, an American football game, a basketball game, a baseball game, a soccer game, a golf match, etc. The first sensory output may be adjusted based on the type of venue, social or cultural norms, or rules of the event. For example, the first sensory output that may be used in a golf match are likely to be substantially subdued relative to what would be permissible in a soccer match. The physical location in some embodiments may also vary based on the level of skill. For example, embodiments in a sport context may be tailored to support novice, peewee, high school, college, or professional sporting levels. Some embodiments are also tailored to the venue of the physical location, such as an auditorium, stage, sports arena, outdoor field, indoor field, etc. As another example, the first sensory output may be silenced, reduced, or overridden during specific events, such as a player injury to avoid an inappropriate or insensitive environment for the injured player.

Some embodiments further comprise generating a feedback message based, at least in part, on the analysis of the at least one element of user information received from the first set of users; sending the feedback message to the first set of users.

Some embodiments further comprise generating a second sensory output at a device of at least one of the users in the first set of users. In some embodiments the second sensory output is promoted content. Promoted content includes advertisements, rewards, or other messages prioritized and/or targeted for a given user or set of users. For example, promoted content may be targeted to a user based on past usage of the application, location, personal information, or information pulled from a linked account or data source with user information that includes either personally identifying information, such as Facebook, Twitter, or Google, or purchase behavior such as Amazon.com, Target.com, Fanatics.com, Dick's Sporting Goods, or other retailers.

In some embodiments the feedback message compares at least one outcome at the event with the first sensory output. For example, if the first sensory output of an embodiment augments cheering during a participant's possession of a ball during gameplay, some embodiments compare or correlate the timing and/or volume with the cheering on the participant's success rate in scoring a goal. Similarly, in some embodiments negative opinion information that yields a first sensory output, such as booing, is compared or correlated to the participant's failure rate in scoring a goal. The feedback message may vary in different embodiments to show the relationship between the first sensory output and various outcomes during the live event. For example, in some embodiments the feedback message comprises a video clip or a series of video clips where the first sensory output is perceptible in the video clips or where additional animations in the video indicate the volume, timing or other characteristics of the first sensory output to show users the relationship between the first sensory output and actions in the event. In some embodiments, the feedback message may aggregate or represent data in other ways, such as bar charts or time domain charts that synchronize actions during the event (such as goals) with one or more stimuli at the event. In some embodiments, the feedback message includes a statistical correlation between a past sensory output and the at least one outcome. In some embodiments, the feedback message comprises a historical representation of a user's user information, including, for example, opinion information, and its relationship to outcomes in an event, e.g., the number of times a user has participated in supporting their team and the team has scored during that participation. In some embodiments, the feedback message indicates a volume of user information and/or the magnitude of the first sensory output at the physical location of an event and/or the physical location of other observers.

In some embodiments the feedback message is a reward to a user. The reward can vary between embodiments and may include points or credit for money, prizes, paraphernalia, chances to win prizes, additional opportunities to participate in generating a sensory output at the physical location of an event and/or the physical location of other observers, and/or additional weight to future user information used in generating sensory outputs at the physical location of an event and/or the physical location of other observers. For example, because a user participated in generating a previous sensory output at the event, the feedback message in some embodiments will invite a user to provide additional user information, such as opinion information, during the event. In other embodiments, the feedback message may comprise replay video clips, device vibration, and/or push notifications when user information inputs are commensurate with significant moments during an event, demonstrating the active fan base's impact on participant performance.

Some embodiments of the present invention comprise a system for promoting event participation. In some embodiments, such systems comprise a first server capable of receiving at least one element of user information from a first set of users. Some embodiments comprise a first processor capable of analyzing the at least one element of user information received from the first set of users. Some embodiments generate a first output signal from the first processor. Some embodiments generate a first sensory output from an audiovisual system based on the first output signal, where the first sensory output is generated at a physical location of an event.

One embodiment of the present invention utilizes opinion information received from remote users during a live event to cater to consumer interest for branded articles. For example, some embodiments comprise analyzing an element of user information from a first set of multiple users, where the element of user information includes opinion information provided during the occurrence of an event at a physical location. In some embodiments the opinion information indicates a preference for a participant in the event. Based on the preferences indicated, some embodiments can cater advertisements to that user information, including opinion information, and promote related merchandise to a user from the first set of multiple users where the related merchandise has a relationship to the preference indicated by the first user. In some embodiments the step performing the analyzing of the element of user information occurs at or near the time that the event is occurring. For example, a user who elects to "cheer" for a specific player or team, may receive promotions or advertisements for that player or team, at or near the time of the event to which the user is providing their opinion information to "cheer" for that player or team. In other embodiments the analysis of user information may be used to predict sales or popularity of merchandise related to a participant, player, or team based on user information, including opinion information, gathered during the event. Such information may be used to predict sales volumes and anticipate demand for merchandise.

Some embodiments of the present invention comprises systems and methods for promoting event participation comprising receiving a first element of user information from a first observer to an event at a server. Some embodiments comprise receiving a second element of user information from a second observer to an event at the server. Some embodiments also comprise analyzing the first and second elements of user information received from the first and second observers with a processor to determine a magnitude for a first sensory output based on the analysis of the first and second elements of user information. Some embodiments also comprise transmitting the first sensory output to at least one physical location in near real-time relative to the receipt of the second element of user information. In some embodiments, the at least one physical location comprises a location of the first observer. Some embodiments comprise analyzing the first and second elements of user information at a processor to determine a feedback message. Some embodiments comprise transmitting the feedback message to the first observer. In some embodiments, the feedback message comprises a comparison between an outcome at the event with the magnitude for the first sensory output. In some embodiments, the feedback message comprises an information regarding the historical relationship between a set of past user information of the same type as the first element of user information and an outcome at the event. A person of ordinary skill will appreciate that these embodiments may be combined or adapted with other aspects of the inventions described elsewhere in this disclosure.

Turning to FIG. 1, an exemplary embodiment of the present systems 100 comprises a first server 110 capable of receiving at least one element of user information from a first set of users 101a-101d. In some embodiments users such as 101a-101d may be using smartphones, personal computing devices, tablets, virtual reality devices, augmented reality devices, or the like (e.g., devices 102a-102d) to communicate with the server 110. The connection 140 between the server 110 and devices 102a-102d may be established through any suitable electronic network, such as the public interne, a local area network, a private network, a virtual private network, a wireless area network, a telecommunications system such as 5G-NR or 4G LTE, and/or the like. The server 110 may consist of one or multiple servers, routers, switches, and/or processors. In some embodiments server 110 includes a processor capable of analyzing at least one element of user information received from the first set of users 101a-101d or user devices 102a-102d. In some embodiments the analyzing is performed by processors that are separate from the server 110. The results of the analysis of the user information performed by the processor is then transmitted to audiovisual system 120. In the embodiment illustrated in FIG. 1, the results of the analysis of the user information is transmitted from server 110 to the audiovisual system 120 through connection 150. In some embodiments this connection 150 may be replaced or be augmented by a connection between the separate processor or processors that participate in analysis of the user information. Based on the analysis of the user information performed by the server 110 and/or associated processor(s), the audiovisual system 120 generates a first sensory output from the audiovisual system 120 based on the first output signal received through connection 150. The sensory output signal generated by audiovisual system 120 is generated or produced at a physical location of an event 130, such as an arena, sports complex, auditorium, field, stadium, or other event venue.

In some embodiments the connection 140 between the server 110 and the devices 102a-102d facilitate communication both to the server 110 and to the users 102a-102d. Accordingly, the first output signal that is transmitted through connection 150 to the audiovisual system 120, and variations thereof, may also be transmitted to one or more users 102a-102d through connection 140. A person of ordinary skill will appreciate that the embodiment depicted in FIG. 1 is exemplary and different configurations of computational and communication elements may be used to facilitate communication of user information to one or more processing elements to then transmit an output signal to the physical location of an event or to the physical location of one or more users, where the output signal is based on an analysis of received user information.

A person of ordinary skill in the art will appreciate that some embodiments of the present systems may be adapted to implement any or all of the methods described herein, including, for example, the embodiments illustrated in FIGS. 2-5 and described below.

Figure 2:
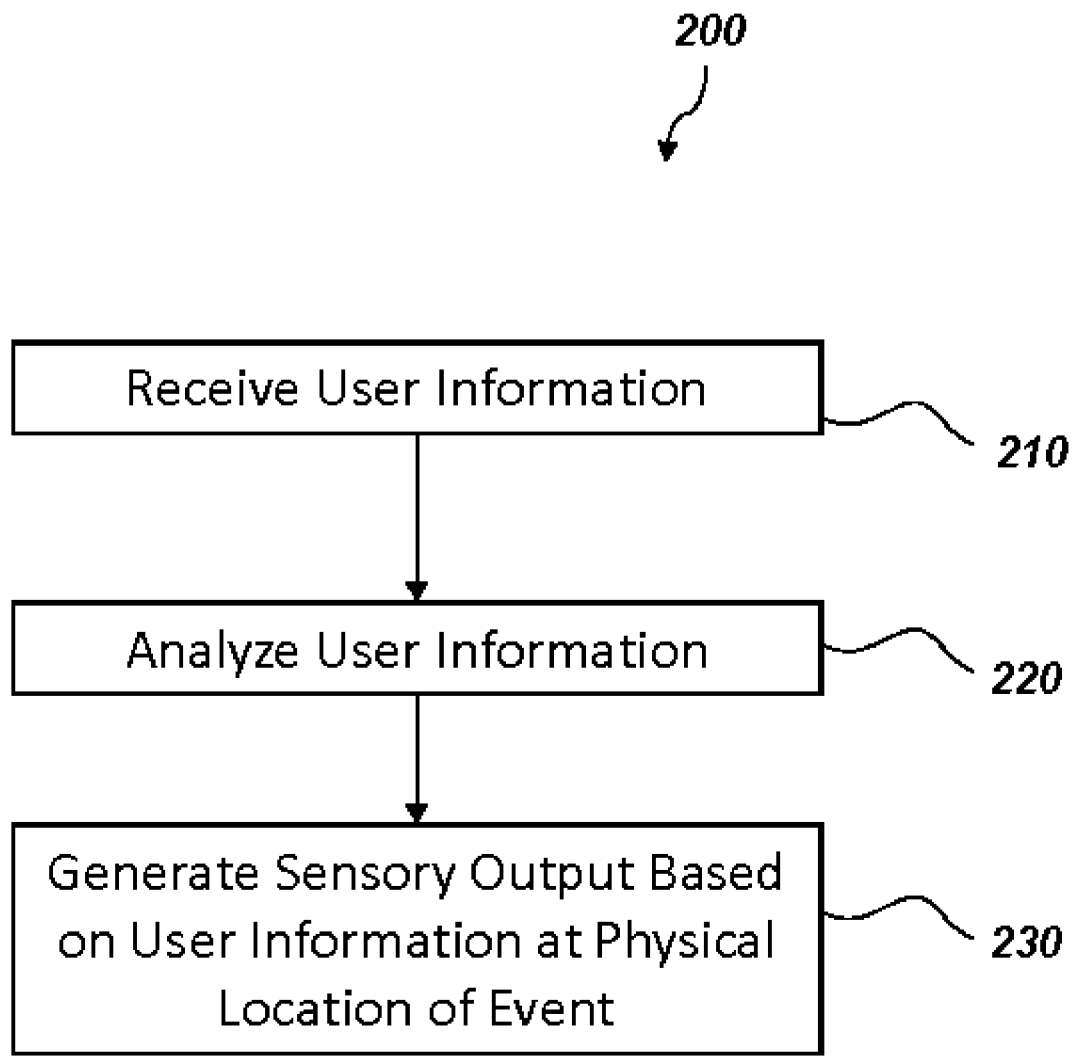
FIG. 2 illustrates one embodiment for receiving user information to generate a sensory output at the physical location of an event and/or the physical location of other observers.

Turning to FIG. 2, an exemplary embodiment of the present systems and methods is depicted by process 200. In some embodiments, user information is received at step 210. Such information may be received by one or more computers, processors, servers, or combination of computational elements. For example, user information may be received by the server 110 shown in FIG. 1. Next, some embodiments analyze the received user information at step 220. This analysis may be performed by one or more computers, processors, servers, or a combination of computational elements. At step 220, various statistical or data manipulations occur in different embodiments. For example, in some embodiments, the analysis step 220 may include, averaging, aggregating, pooling, offsetting, weighting, filtering, algebraic manipulation, variance analysis, correlation analysis, chi-squared testing, factor analysis, deviation analysis, product-moment correlation analysis, regression analysis, and/or any other statistical analysis. Next, some embodiments generate a sensory output at step 230 based on the analysis performed in step 220. In some embodiments the analysis of step 220 is performed by the same computation elements as step 230; however, in some embodiments these steps are performed by different or unrelated hardware with common data link.

Figure 3:
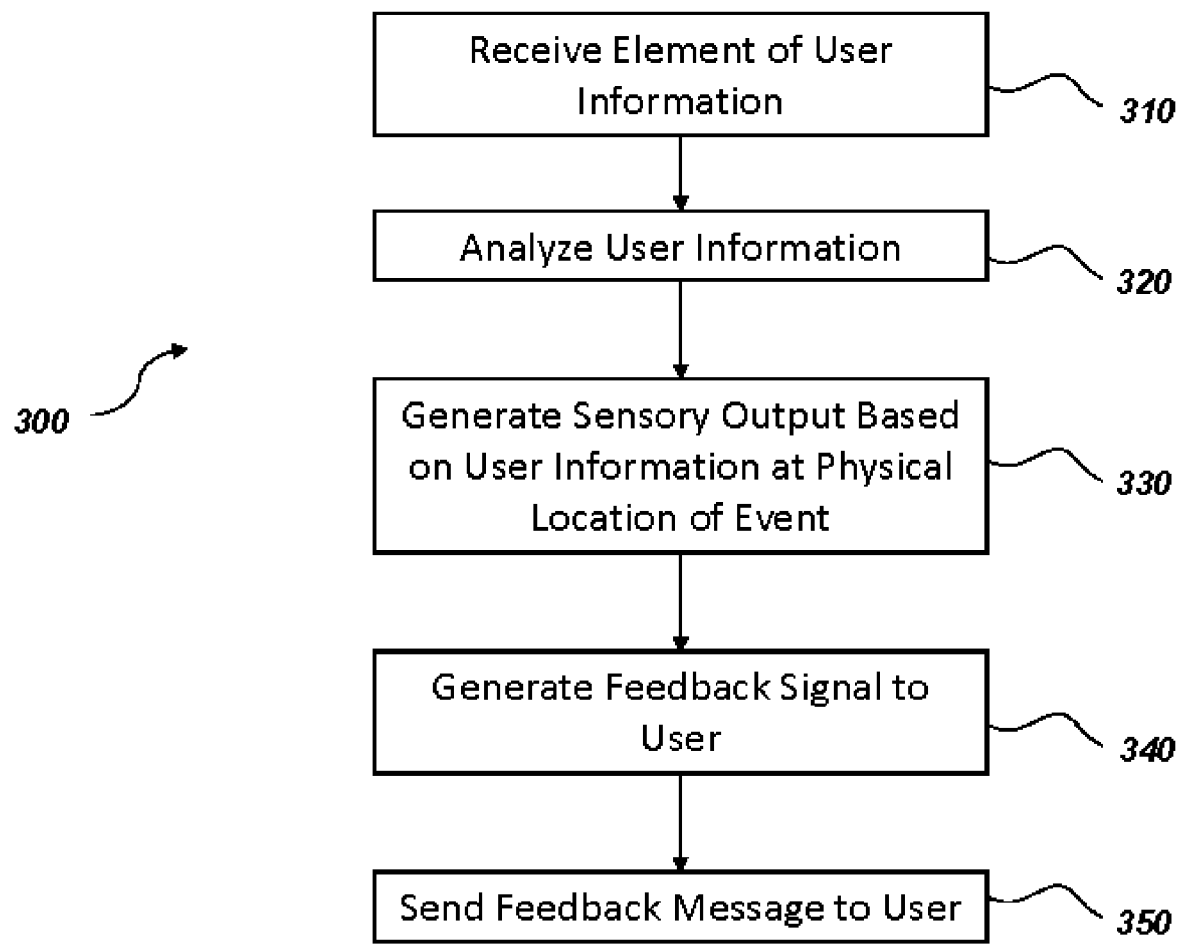
FIG. 3 illustrates one embodiment for providing feedback to a user after generating a sensory output at the physical location of an event and/or the physical location of other observers.

Turning to FIG. 3, an exemplary embodiment of the present systems and methods is depicted by process 300. In the depicted embodiment, the steps from FIG. 2 are repeated with additional steps 340 and 350. The description of FIG. 2 above is also true of FIG. 3. The embodiment depicted in FIG. 3 is unique from FIG. 2 through the inclusion of step 340 in which a feedback signal is sent to a user. Various embodiments of the feedback signal in step 340 are discussed above. It is worth noting that step 340 for generating a feedback symbol may be entirely or only partially based on the analysis performed at step 220 in FIG. 2 and step 320 of FIG. 3. In other embodiments the feedback signal at step 340 is based either entirely or in part on analysis of the sensory output that was generated in step 230 of FIG. 1 and step 330 of FIG. 2. The additional analysis performed to generate the feedback signal at step 340 may be performed by the same computational elements that performed the analysis of step 320 in some embodiments. In some embodiments, different computational elements may perform the analysis to generate the feedback signal at step 340. Similar to step 320, the analysis at step 340 may be performed by one or more computers, processors, servers, or a combination of computational elements. And, step 340 analysis may include various statistical or data manipulations in different embodiments. For example, in some embodiments, the analysis step 340 may include, averaging, aggregating, pooling, offsetting, weighting, filtering, algebraic manipulation, variance analysis, correlation analysis, chi-squared testing, factor analysis, deviation analysis, product-moment correlation analysis, regression analysis, and/or any other statistical analysis. In some embodiments the analysis of step 320 is performed by the same computation elements as step 330 and/or 340; however, in some embodiments these steps are performed by different or unrelated hardware with common data link. In some embodiments the generated feedback signal at step 340 is sent back to a user as a feedback message. The form of the feedback message depends on the embodiments and may be implemented according to embodiments described elsewhere in this disclosure. Some embodiments of the process 300 may also include generating a sensory output at a user's device. And in some embodiments, the sensory output at a user's device is promoted content.

Figure 4:
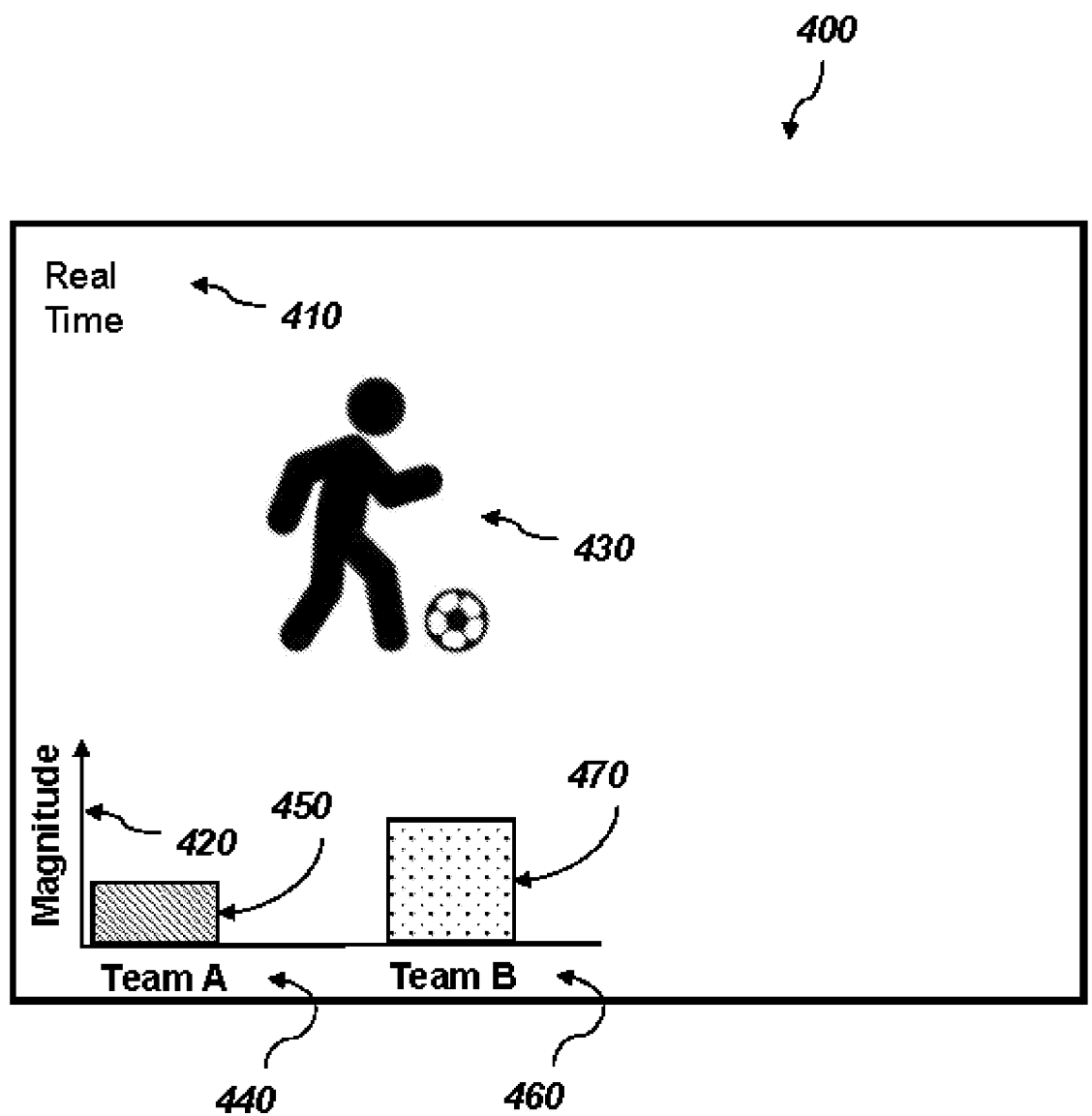
FIG. 4 illustrates an example display of information gathered and/or analyzed according to methods of some embodiments that is synchronized with a real time event or a recording of a real time event.
Figure 5:
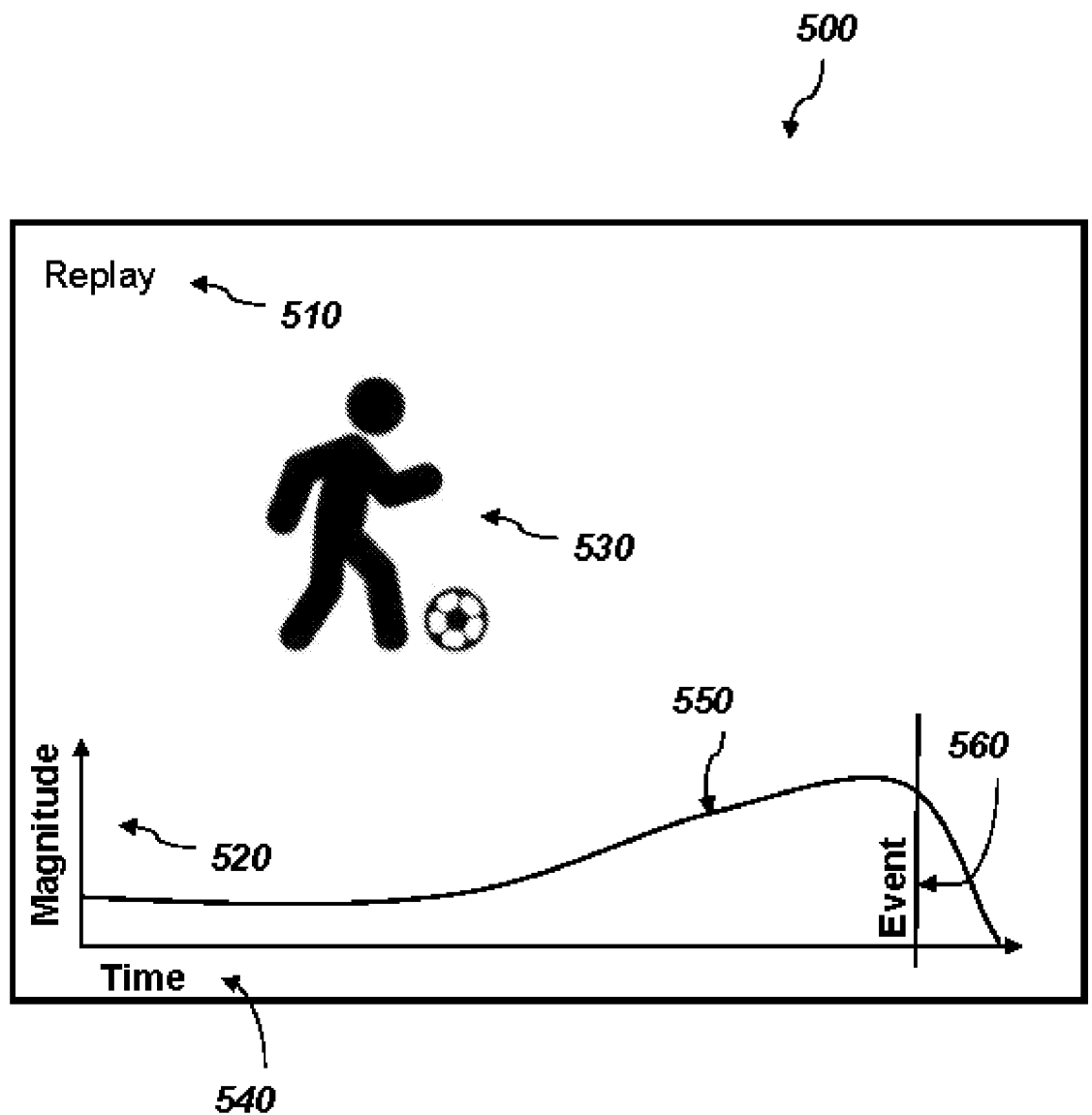
FIG. 5 illustrates an example display of information gathered and/or analyzed according to methods of some embodiments that is synchronized with a real time event or a recording of a real time event.

Turning to FIGS. 4 and 5, examples of feedback messages that may be generated in some embodiments of the present systems and methods are depicted. Referring back to FIG. 1 for reference, identical or similar computational elements, such as server 110, is capable in some embodiments of receiving an element of user information from a first set of users. In some embodiments, a first processor is capable of analyzing the element of user information. The first processor outputs a first graphical image file capable of depicting a statistic for the element of user information, such as the graphical elements indicated by 420, 440, 450, 460, and 470, or 520, 540, 550, and 560. In some embodiments the statistic changes over time and is synchronized with a second graphical image file 510 capable of depicting an occurrence of a physical event, as shown, for example, by curve 550 showing the magnitude 520 of the element of user information along a time axis 540. The coincidence of a statistic value along curve 550 is mapped against the occurrence of an event 560 performed by a participant 530, such as shooting a goal in soccer. In this way, users are able to see the impact of their participation in an event via provided user information, such as opinion information discussed previously. It is appreciated that the second graphical image depicting the actions of a participant (indicated by 410 and 430, and 510 and 530, in FIGS. 4 and 5 respectively) may be separate from the first graphical image depicting a statistic for an element of user information. Accordingly the respective files for the first and second graphical images may be separate In some embodiments, the images may be combined or overlaid to create a single graphical image or graphical image file. Some embodiments also comprise a second server capable of transmitting the first and second graphical image files to the first set of users. In some embodiments the same server performs the functions of both the first server that receives the element of user information and the second server that transmits the graphical image files to the users.

The above specification and examples provide a complete description of the structure and use of an exemplary embodiment. Although certain embodiments have been described above with a certain degree of particularity, or with reference to one or more individual embodiments, those skilled in the art could make numerous alterations to the disclosed embodiments without departing from the scope of this invention. As such, the illustrative embodiment of the present computational fluid dynamics is not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

What is claimed is:

1. A method of catering to consumer interest for branded articles comprising:

analyzing an element of user information from a first set of multiple users, where the element of user information includes opinion information provided during the occurrence of an event at a physical location, and where the opinion information indicates a preference for a participant in the event;

performing the analyzing of the element of user information near the time that the event is occurring;

promoting a branded article to a first user from the first set of multiple users, where the branded article has a branding related to the preference indicated by the first user.

2. A system for identifying consumer demand for branded articles comprising:

a first server capable of receiving at least one element of user information from a first set of users;

a first processor capable of analyzing the at least one element of user information received from the first set of users;

where the system receives the at least one element of user information from a first set of users;

analyzes the at least one element of user information received from the first set of users;

generates a first sensory output based, at least in part, on the at least one element of user information, where the first sensory output is produced at a physical location where the first set of users are not physically present, and where the step of generating the first sensory output occurs in real-time with an event;

correlates the timing of the at least one element of user information from the first set of users with the timing of events occurring at the physical location to produce correlation data where the correlation data indicates a sentiment of the first set of users.

3. The system of claim 2 where the sentiment of the first set of users includes information about positive sentiments toward a person or a brand.

4. The system of claim 2 where the sentiment of the first set of users includes information about negative sentiments toward a person or a brand.

5. The system of claim 2 where the sentiment of the first set of users changes with the timing of events occurring at the physical location.

6. The system of claim 2 where the at least one element of user information from a first set of users is a request for the first sensory output.

7. The system of claim 2 where the first sensory output is an audio signal played at the physical location of the event that is perceptible to at least one participant in the event.

8. The system of claim 6 where the first sensory output is simulated clapping.

9. The system of claim 6 where the first sensory output is simulated crowd noise.

10. The system of claim 6 where the first sensory output is music.

11. The system of claim 2 where the first sensory output is a visual stimulus played at the physical location of the event that is perceptible to at least one participant in the event.

12. The system of claim 10 where the visual stimulus is a pyrotechnic display at the physical location of the event that is perceptible to at least one participant in the event.

13. The system of claim 10 where the visual stimulus is a graphic displayed at the physical location of the event that is perceptible to at least one participant in the event.

14. The system of claim 2 where the at least one physical location of the event comprises a sports arena.

15. A method of promoting event participation comprising:
- receiving a first element of user information from a first observer to an event at a server;
- receiving a second element of user information from a second observer to an event at the server,
- analyzing the first and second elements of user information received from the first and second observers with a processor to determine a magnitude for a first sensory output based on the analysis of the first and second elements of user information;
- transmitting the first sensory output to at least one physical location in near real-time relative to the receipt of the second element of user information
- where the at least one physical location comprises the location of the event.

16. The method of claim 15 further comprising:
- analyzing the first and second elements of user information at a processor to determine a feedback message;
- transmitting the feedback message to the first observer.

17. The method of claim 16 where the feedback message comprises a comparison between an outcome at the event with the magnitude for the first sensory output.

18. The method of claim 16 where the feedback message comprises an information regarding the historical relationship between a set of past user information of the same type as the first element of user information and an outcome at the event.

* * * * *